(12) United States Patent
Blaise et al.

(10) Patent No.: US 12,275,202 B2
(45) Date of Patent: Apr. 15, 2025

(54) METHOD FOR PRODUCING AN AERODYNAMIC ELEMENT INCLUDING RIBLETS

(71) Applicants: SAFRAN AIRCRAFT ENGINES, Paris (FR); SAFRAN AEROSPACE COMPOSITES, Rochester, NH (US)

(72) Inventors: Maxime Marie Désiré Blaise, Moissy-Cramayel (FR); Allison Glugla, Moissy-Cramayel (FR); Lauren Chin, Moissy-Cramayel (FR); Cali Lapenta, Moissy-Cramayel (FR)

(73) Assignees: SAFRAN AIRCRAFT ENGINES, Paris (FR); SAFRAN AEROSPACE COMPOSITES, Rochester, NH (US)

( * ) Notice: Subject to any disclaimer, the term of this patent is extended or adjusted under 35 U.S.C. 154(b) by 0 days.

(21) Appl. No.: 17/980,931

(22) Filed: Nov. 4, 2022

(65) Prior Publication Data

US 2023/0182411 A1 Jun. 15, 2023

Related U.S. Application Data

(60) Provisional application No. 63/275,548, filed on Nov. 4, 2021.

(51) Int. Cl.
*B29C 70/44* (2006.01)
*B29L 31/08* (2006.01)
*B64C 21/10* (2006.01)

(52) U.S. Cl.
CPC .......... *B29C 70/44* (2013.01); *B29L 2031/08* (2013.01); *B64C 21/10* (2013.01); *B64C 2230/26* (2013.01)

(58) Field of Classification Search
None
See application file for complete search history.

(56) References Cited

U.S. PATENT DOCUMENTS

| | | | | |
|---|---|---|---|---|
| 3,471,354 A | * | 10/1969 | Scofield | B32B 27/00 |
| | | | | 118/44 |
| 5,173,314 A | * | 12/1992 | Hosoi | B29C 53/04 |
| | | | | 425/389 |
| 2006/0266472 A1 | * | 11/2006 | Kipp | B29C 70/44 |
| | | | | 425/389 |
| 2016/0214328 A1 | * | 7/2016 | MacAdams | B29C 66/73941 |

* cited by examiner

*Primary Examiner* — Christopher T Schatz
(74) *Attorney, Agent, or Firm* — McDonald Hopkins LLC

(57) ABSTRACT

A method for producing an aerodynamic element for an aircraft, including a wall which is covered, at least partially, by a printed film including a plurality of ribs and/or grooves, the method including: providing a raw film made of a deformable material which is devoid of grooves and ribs; providing a pressure plate which includes a face provided with ribs and/or grooves complementary to the ribs and/or grooves of the printed film; placing said raw film on the wall of the element; positioning the pressure plate on the raw film, the printed side of the pressure plate facing the raw film; and a forming step during which the raw film is bonded with the wall of the component and during which the raw film is shaped by cooperation with the pressure plate to obtain the printed film including the ribs and/or the grooves.

4 Claims, 3 Drawing Sheets

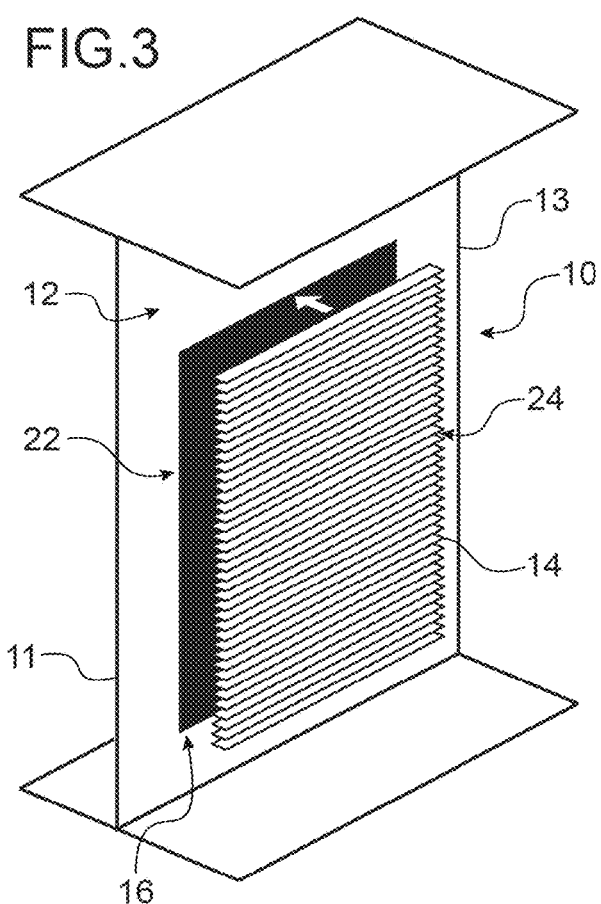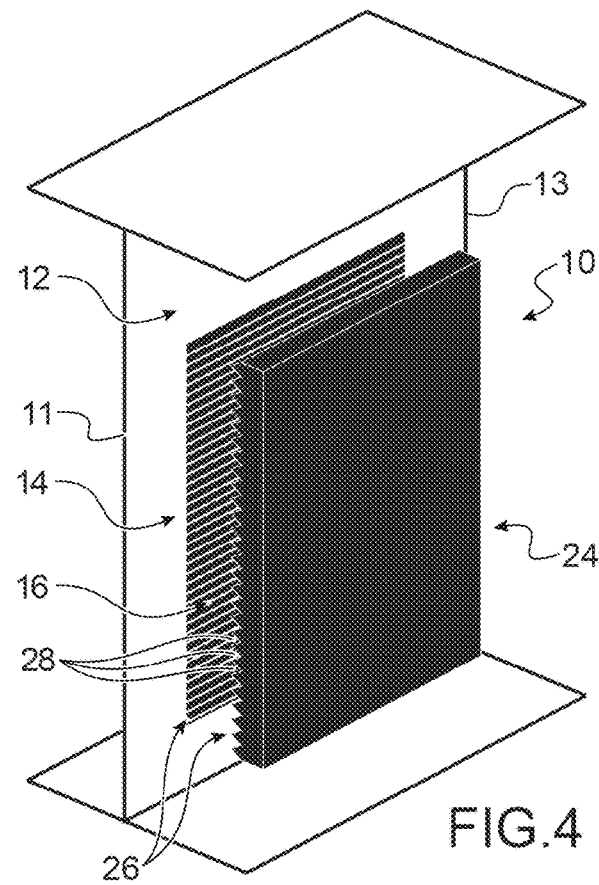

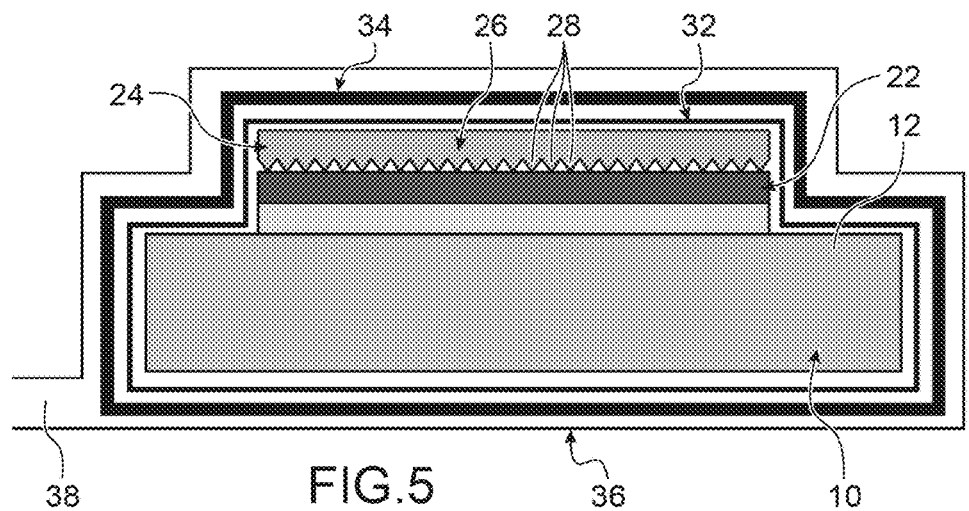
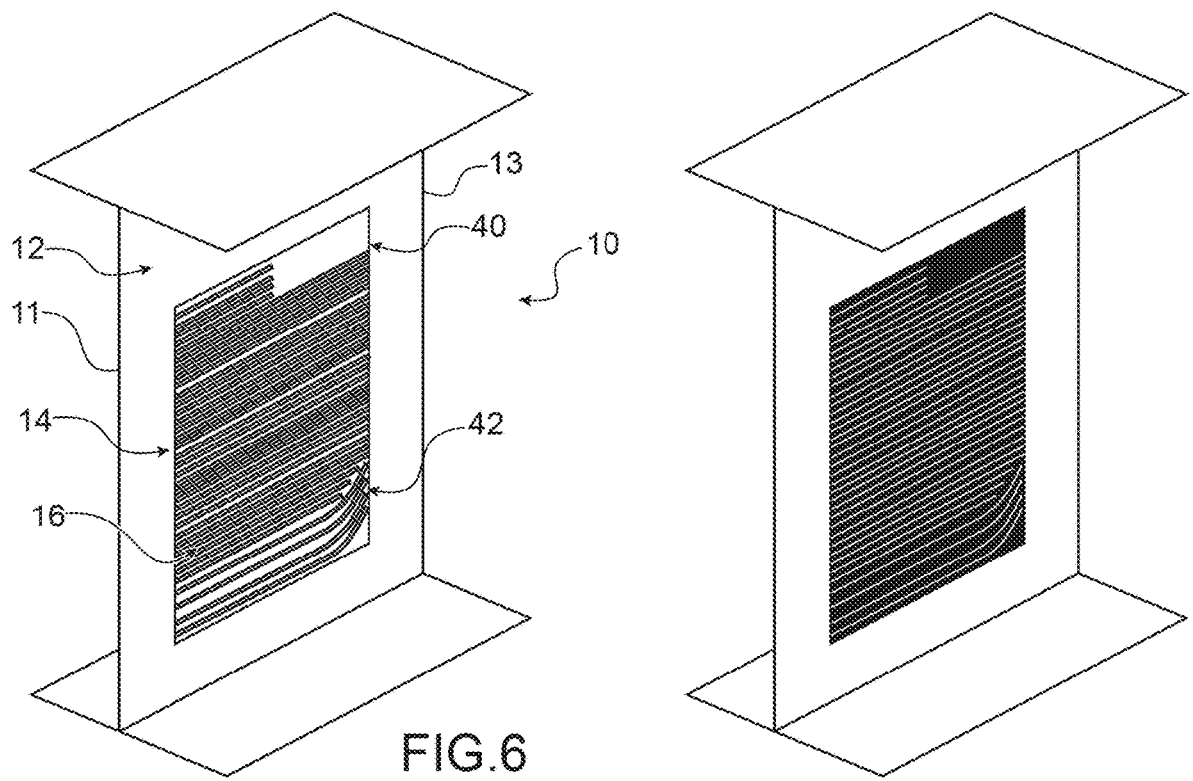

METHOD FOR PRODUCING AN AERODYNAMIC ELEMENT INCLUDING RIBLETS

TECHNICAL FIELD

The invention relates to a method for producing a vane, such as for example a panel for an aircraft wing or a turbine engine blade, which includes a succession of ribs and grooves oriented parallel to the air flow.

The invention more particularly proposes a method for producing the ribs/grooves on a film of plastic material which is affixed to the vane.

PRIOR ART

With a view to improving the performance of an aircraft turbomachine, it has been proposed to add ribs and/or grooves to one face of certain aerodynamic components, for example to one face of a turbine stator vane.

These ribs/grooves, commonly called "Riblets", are oriented parallel to the flow direction of the air flow and are disposed on a wall of the vane.

The riblets commonly, but in a non-limiting manner, have a height and a width whose value is of the order of 10 to 50 micrometers and extend longitudinally over a major part of the vane.

They have the effect of reducing the friction of the fluid on the surface of the vane and consequently of reducing the induced drag. This allows to improve the performance of the turbomachine.

According to one embodiment, the riblets are formed on a film which is subsequently affixed to the lower surface wall and/or the upper surface wall of the vane, in particular by gluing.

Such an embodiment allows to easily manufacture the riblets on a film, which will be called printed film, which is relatively easy to affix to the vane.

The printed film is generally produced by a subcontractor according to precise shape and size criteria, then it is bonded to the vane during a bonding step.

Conventionally, the film is made of plastic material such as polyurethane and is bonded to the vane by autoclave bonding.

Although this method for producing a printed film by a subcontractor simplifies production for the vane manufacturer, it involves an additional cost because the price of a printed film is higher than that of a raw film.

The object of the invention is to propose a method for producing a vane including a printed film which limits the production costs without increasing the production time of the vane.

DISCLOSURE OF THE INVENTION

The invention proposes a method for producing an aerodynamic element, in particular for an aircraft, including a wall which is covered, at least partially, by a printed film including a plurality of ribs and/or grooves, the method including
a step of providing a raw film made of a deformable material which is devoid of grooves and ribs;
a step of providing a pressure plate which includes a face provided with ribs and/or grooves complementary to the ribs and/or grooves of the printed film;
a step of placing said raw film on the wall of the element;
a step of positioning the pressure plate on the raw film, the printed side of the pressure plate facing the raw film;
a forming step during which the raw film is bonded with the wall of the component and during which the raw film is shaped by cooperation with the pressure plate to obtain the printed film including the ribs and/or the grooves.

The production of the ribs and/or grooves during the step of bonding the film to the vane allows to carry out two actions simultaneously, which allows to save production time.

In addition, the method is implemented using a raw film as the raw material, which reduces the cost compared to a method using a film already having ribs and/or grooves.

Preferably, the forming step consists of a step of curing in an autoclave.

Preferably, the method includes a step consisting in covering the assembly comprising the element, the raw film and the pressure plate successively with a release film, a felt film and a vacuum bag which is implemented before the forming step.

Preferably, during the step of placing the raw film on the wall of the element, an adhesive material film is interposed between the wall of the element and the raw film, said adhesive material film being capable of polymerizing during the forming step.

The invention also relates to a pressure plate intended to be used for the implementation of a method according to any one of the preceding claims, which includes a face having ribs and/or grooves complementary to the ribs and grooves to be obtained.

Preferably, the pressure plate is intended for use with an element of which said wall is curved, and the face of the pressure plate is curved in a manner similar to that of said wall.

Preferably, the pressure plate is made of silicone or non-silicone rubber, the hardness of which is comprised between 50 and 90 Shore A.

Preferably, the pressure plate is made of metal and the printed face of which is formed by laser abrasion.

The invention also relates to an aerodynamic element including a wall on which a printed film is bonded according to a method according to any one of claims to, characterized in that the printed film includes at least one area including no ribs or grooves and/or includes at least one area including ribs and/or grooves whose profile is different from the rest of the printed film.

Preferably, the printed film is made of polyurethane.

BRIEF DESCRIPTION OF THE DRAWINGS

Other features and advantages of the invention will appear upon reading the detailed description which follows for the understanding of which reference will be made to the appended figures, among which:

FIG. 3 is a view similar to that of FIG. 1, illustrating a step of placing a pressure plate on a raw film which has been affixed to the vane.

FIG. 4 is a view similar to that of FIG. 3, showing a step of removing the pressure plate after the implementation of the bonding step.

FIG. 5 is a schematic sectional representation of an installation implementing the simultaneous operation of bonding and shaping the film.

FIG. 6 is a view similar to that of FIG. 1 showing an alternative embodiment of the printed film including an area devoid of riblets and an area having different riblets.

DETAILED DESCRIPTION OF PARTICULAR EMBODIMENTS

Figure 1:
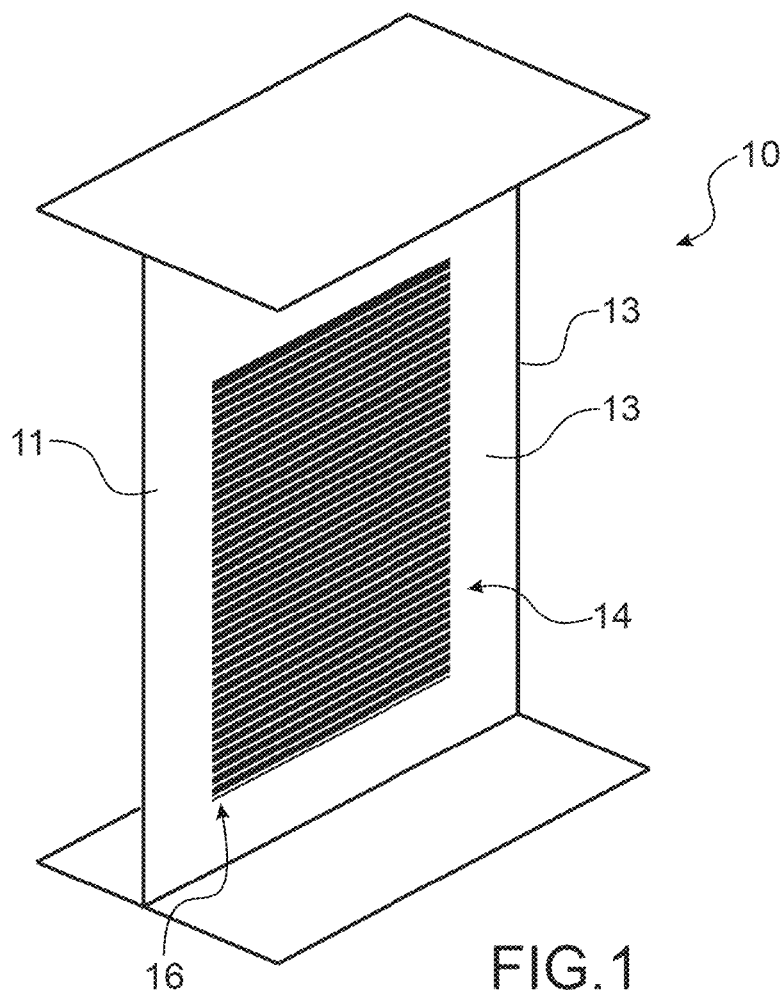
FIG. 1 is a schematic representation in perspective of a turbomachine stator vane including riblets produced according to the invention.

FIG. 1 shows a vane 10 which here consists of a turbomachine stator vane.

The vane 10 is of radial main orientation with respect to an axis of the turbomachine and includes an aerodynamically profiled body delimited by a lower surface wall (not visible), an upper surface wall 12, joined by a leading edge 11 and a trailing edge 13.

In order to improve the aerodynamic efficiency of the vane 10, a film 14 including riblets 16 is glued to the upper surface wall 12 of the vane 10. In the following description, the film 14 including the riblets 16 will be called printed film 14.

According to the embodiment shown in FIG. 1, the printed film 14 covers only part of the upper surface wall 12.

It will be understood that the invention is not limited to this embodiment and that the printed film 14 can cover the whole of the upper surface wall 12 or several printed films 14 can be disposed on the upper surface wall 12 in strategic places.

Figure 2:
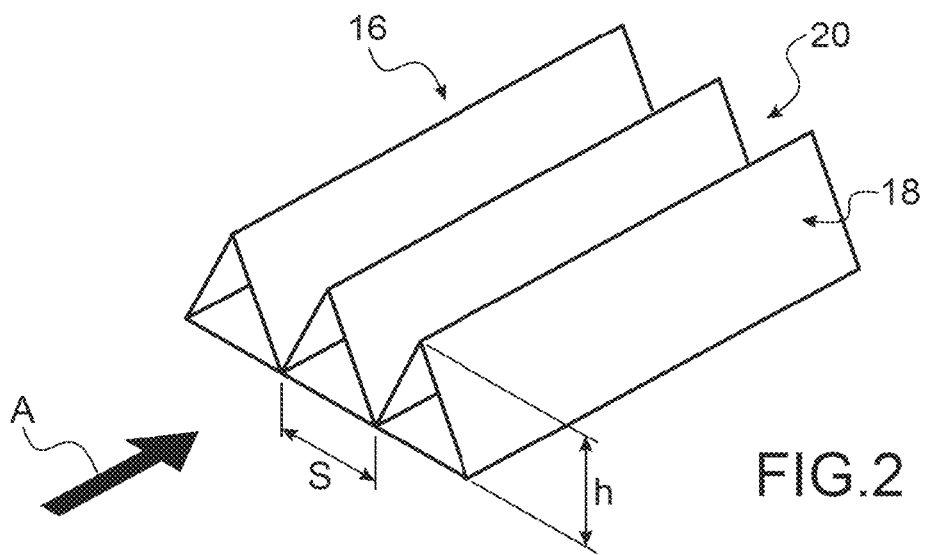
FIG. 2 is a detail on a larger scale of an exemplary embodiment of riblets.

As can be seen in more detail in FIG. 2, the riblets 16 consist of a succession of ribs 18 and grooves 20 which are oriented along a longitudinal direction, that is to say parallel to the direction of circulation of air flow A on the upper surface wall 12.

Here, the height "h" and the width "s" of the ribs 18 and the grooves 20 are very low, that is to say of the order of 10 to 50 micrometers. It will be understood that the invention is not limited to these dimensions of the riblets which can consequently be larger or smaller.

The section of the riblets 16 is here triangular. It will be understood that the invention is not limited to this shape of the riblets, which can be, by way of non-limiting example, trapezoidal or slotted.

The longitudinal length of the riblets 16 is defined according to the length of the printed film 14 including the same.

The printed film 14 is made of a plastic material. Preferably, it is made of polyurethane (PU) and it is glued to one and/or the other of the lower surface wall or the upper surface wall 12 of the vane 10.

In the following description, reference will be made to a method for producing a vane 10 allowing the fixing and production of a printed film 14 including the riblets on the upper surface wall 12. It will be understood that the invention can also relate to the fixing of such a printed film 14 on the lower surface wall or on the lower surface wall and on the upper surface wall.

At the start of the method, the vane 10 does not include a printed film 14.

In addition, provision is made of a raw film 22 the two faces of which are devoid of riblets 16.

This raw film 22 will be shaped during the method so that one of its faces includes the riblets 16, and thus becomes a printed film 14.

Also, a pressure plate 24 is used during the method.

As can be seen in FIGS. 4 and 5, the pressure plate 24 has a printed face 26 including ribs and/or grooves 28. These ribs and/or grooves 28 are complementary to the riblets 16 to be obtained.

In a first step of the method, the raw film 22 is provided and it is placed on the upper surface wall 12.

An adhesive material film 30 is interposed between the upper surface wall 12 of the vane 10 and the raw film 22, holding it in place.

In a second step, the pressure plate 24 which has been described above is placed on the raw film 22, its printed face 26 facing the raw film 22.

In a third step, the assembly including the vane 10, the raw film 22 and the pressure plate 24 is subjected to a forming step during which the adhesive material film 30 is polymerized to make the bond between the raw film 22 and the upper surface wall 12 permanent.

Also, during this forming step, the ribs and/or grooves 28 of the pressure plate 24 are printed on the raw film 22 to thus form a printed film 14 including the riblets 16.

According to a preferred embodiment, the forming step consists of a step of curing in an autoclave.

This step is implemented at a high temperature allowing to solidify the adhesive material film 30 and also allowing to soften the raw film 22 so that it can be shaped under the action of the pressure plate 24.

As shown in FIG. 5, for the implementation of the forming step, the assembly including the vane 10, the raw film 22 and the pressure plate 24 is successively surrounded by a release film 32, a felt film 34 then a vacuum bag 36.

A sticky tape 38 seals the closure of the vacuum bag 36.

The vacuum is created in the vacuum bag 36, to remove all the air present inside the latter and more particularly the air which may be present between the ribs and grooves of the pressure plate 24 and the raw film 22.

Then, the whole is placed in an autoclave for curing the adhesive material film 30 and printing the riblets 16 on the raw film 22.

At the end of the curing step, the raw film has become a printed film 14 including the riblets 16 which is secured to the upper surface wall 12 of the vane 10.

After cooling, the assembly is removed from the vacuum bag 36, the felt film 34 and the release film 32 are removed.

Finally, as shown in FIG. 4, the pressure plate 24 is detached from the vane 10, leaving a printed film 14 including the riblets 16 which is secured to the vane 10.

According to the embodiment shown in the figures, the upper surface wall 12 is shown as flat. It will be understood that the invention is not limited to this embodiment, especially since the walls of a vane are curved to be concave and/or convex.

Thus, the raw film 22 which is affixed to the upper surface wall 12 is also bent according to the shape of the upper surface wall 12 after it has been placed thereon.

The draping of the raw film 22 on the upper surface wall is then simplified compared to a draping according to the prior art of a film having riblets.

Indeed, a film having riblets is complex to be draped for an operator, has the problem of not being able to be unframed and is limited to developable forms.

On the contrary, a raw film 22 can be shaped during the forming step, allowing to eliminate the disadvantages mentioned above.

Also, the pressure plate 24 has a printed face which is of general shape complementary to the shape of the upper surface wall 12, which allows to have an optimal shaping of the raw film 22, even in areas of the upper surface wall 12 having undulations or other complex three-dimensional shapes.

According to the embodiment which has been described, the riblets 16 are all parallel and extend over the entire surface of the printed film 14.

According to a variant embodiment, the printed film 14 includes one or more areas not having riblets 16 and/or one or more areas wherein the riblets are not parallel to the other riblets, which allows to have a particular aerodynamic effect.

According to this variant embodiment, the printed face 26 of the pressure plate includes one or more areas 40 without riblets or grooves 28 or one or more areas 42 for which these ribs and/or grooves 28 are of different and complementary shapes to the riblets not parallel to the other riblets 16.

This embodiment variant is relatively easy to implement since it only requires the production of a pressure plate 24 including the areas complementary to the areas 40, 42 to be obtained.

Pressure plate 24 can be made of silicone or non-silicone rubber. According to a preferred but non-limiting embodiment, the hardness of the silicone or non-silicone rubber is comprised between 50 and 90 Shore A and this constitutes a necessary variable in order to achieve the required geometry of the riblets 16.

The pressure plate 24 can also be metallic, for example when the geometry requires more rigidity. It can for example be produced by laser abrasion of the printed face 26.

The invention claimed is:

1. A method for producing an aerodynamic element, including a wall which is covered, at least partially, by a printed film including a plurality of ribs and/or grooves, the method including: a step of providing an element that does not include a printed film; a step of providing a raw film made of a deformable material which is devoid of grooves and ribs; a step of providing a pressure plate which includes a face provided with ribs and/or grooves complementary to the ribs and/or grooves of the printed film; a step of placing said raw film on the wall of the element; a step of positioning the pressure plate on the raw film, a printed side of the pressure plate facing the raw film; a forming step during which the raw film is bonded with the wall of the element and during which the raw film is shaped by cooperation with the pressure plate to obtain the printed film including the ribs and/or the grooves, wherein only one of the faces of the raw film is shaped to include riblets which comprise of a succession of the ribs and the grooves, wherein the aerodynamic element is a vane or a part of an aircraft wing.

2. The method according to claim 1, wherein the forming step includes a step of curing in an autoclave.

3. The method according to claim 2, further including a step including covering an assembly comprising the element, the raw film and the pressure plate successively with a release film, a felt film and a vacuum bag which is implemented before the forming step.

4. The method according to claim 1, wherein during the step of placing the raw film on the wall of the element, an adhesive material film is interposed between the wall of the element and the raw film, said adhesive material film being capable of polymerizing during the forming step.

* * * * *